United States Patent [19]

Pattas

[11] 4,056,081
[45] Nov. 1, 1977

[54] INTERNAL COMBUSTION ENGINE

[75] Inventor: Konstantin Pattas, Thessaloniki, Greece

[73] Assignee: Daimler-Benz Aktiengesellschaft, Germany

[21] Appl. No.: 578,768

[22] Filed: May 19, 1975

[30] Foreign Application Priority Data

May 22, 1974 Germany ............................. 2424799

[51] Int. Cl.² .............................................. F02B 19/08
[52] U.S. Cl. .............................. 123/75 B; 123/32 ST; 123/127; F02D/31/00
[58] Field of Search ........ 123/119 DB, 124 R, 32 ST, 123/75 B, 127

[56] References Cited

U.S. PATENT DOCUMENTS

| | | | |
|---|---|---|---|
| 1,375,610 | 4/1921 | Schmidt | 123/119 DB |
| 3,224,424 | 12/1965 | Mennicken et al. | 123/119 DB |
| 3,301,539 | 1/1967 | Antonsen | 123/119 DB |
| 3,494,341 | 2/1970 | Serroys | 123/119 DB |
| 3,568,437 | 3/1971 | Briggs | 123/119 DB |
| 3,601,108 | 8/1971 | Nambu | 123/124 R |
| 3,659,564 | 5/1972 | Suzuki et al. | 123/124 R |
| 3,977,380 | 8/1976 | Atsumi et al. | 123/32 ST |
| 3,982,507 | 9/1976 | Asaka et al. | 123/75 B |
| 3,994,268 | 11/1976 | Okunishi et al. | 123/75 B |
| 4,014,960 | 3/1977 | Goto et al. | 123/32 ST |

FOREIGN PATENT DOCUMENTS

| | | | |
|---|---|---|---|
| 531,891 | 11/1921 | France | 123/119 DB |
| 1,228,849 | 12/1962 | Germany | 123/32 ST |

Primary Examiner—Wendell E. Burns
Attorney, Agent, or Firm—Craig & Antonelli

[57] ABSTRACT

An internal combustion engine equipped with an ignition chamber and with a homogeneous mixture supply of the main combustion space, in which the fuel-air ratio of the combustion is so controlled dependent on the load of the engine at least over a portion of the rotational speed range that starting from the upper limit of a lower load range, in which an approximately constant large fuel-air ratio exists, it is reduced with increasing load.

30 Claims, 9 Drawing Figures

INTERNAL COMBUSTION ENGINE

The present invention relates to an internal combustion engine with an ignition chamber and with a homogeneous mixture supply of the main combustion chamber.

In internal combustion engines of the aforementioned type, the main combustion space is supplied over the entire operating range of the engine with a lean mixture remaining essentially constant in its quality, and the ignition energy necessary for igniting this lean mixture is produced in the ignition chamber which is supplied with an approximately stoichiometric and thus with an ignitable mixture.

The supply of the main combustion space with the lean mixture which therefore exhibits a small fuel-air ratio, serves the purpose to attain a combustion which is as low in harmful substances as possible. Connected with this advantage, on the other hand, however, is a decrease in the power output per unit of displacement and therewith also in the maximum output of the engine.

An internal combustion engine of the aforementioned type is to be further developed by the present invention to the effect that for those ranges, for example, for the city-traffic and for the short-distance traffic in which one is particularly concerned with a combustion low in harmful substances, the advantages relating thereto of the known internal combustion engines are preserved but, on the other, a maximum power output yield is made possible also independently thereof.

According to the present invention, this is achieved with an internal combustion engine of the aforementioned type in that the fuel-air ratio of the combustion is controlled dependent on the load of the engine at least over a portion of the rotational speed range in such a manner that this ratio is reduced with an increasing output, starting from the upper limit of a lower load range, in which an approximately constant large fuel-air ratio exists.

The construction according to the present invention which is contemplated in particular for vechicles with a strong engine in relation to the vehicle weight, enables in a simple manner an operation low in harmful substances within the lower load range of the engine, which is of significance essentially for the city and short-distance traffic, and on the other, it makes possible also the maximum output yield at least for the high load range so that a maximum power output can be used for passing or for emergency situations notwithstanding an operation essentially low in harmful substances.

In one embodiment of the present invention, the control of the fuel-air ratio in the aforementioned sense can be limited therebeyond to the lower rotational speed range so that in the higher rotational speed range, which is of importance especially when driving on open highways, it is possible to drive over the entire load range with an approximately stoichiometric mixture and thus a maximum output yield can be attained also with respect to the acceleration and end velocity. The fuel-air ratio will thus be kept constant in the upper rotational speed range.

The control of the fuel-air ratio according to the present invention in dependence on the load of the engine can be achieved in a simple manner in internal combustion engines in which a carburetor is provided for the homogeneous supply of the main combustion space with a mixture, in that an air by-pass is coordinated to the carburetor whose cross section is variable in dependence on the throttle valve position of the carburetor. The change of the cross section of the air by-pass is thereby to be attained in a simple manner by way of an air valve operating as a throttle valve.

A particularly simple over-all construction results thereby, if the air valve is adjustable together with the throttle valve of the carburetor. For purposes of adjusting the air valve, an adjusting cam is preferably provided thereby which, together with the throttle valve of the carburetor is adjustable by way of a customary pedal control.

The common control of the throttle valve of the carburetor and of the air valve can be attained thereby in a most simple manner in that the axis of rotation of the throttle valve and the axis of rotation of the adjusting cam coincide. The control characteristics for the air valve to be attained by way of the cam is thereby approximately such that the air valve, starting from its closed position, is initially opened with an increasing opening of the throttle valve, is fully opened approximately at the upper limit of the lower load range and is then closed again in such a manner that the closing position is attained approximately at full throttle valve opening of the carburetor.

According to a further feature of the present invention, the air valve may be controlled in dependence on the throttle valve position as well as additionally in dependence on the rotational speed in such a manner that the opening angle of the air valve is limited in the upward direction beginning with a predetermined rotational speed.

Accordingly, it is an object of the present invention to provide an internal combustion engine which avoids by simple means the aforementioned shortcomings and drawbacks encountered in the prior art.

Another object of the present invention resides in an internal combustion engine in which a combustion which is as low in harmful substances as possible is combined with a good maximum output of the engine.

A further object of the present invention resides in an internal combustion engine provided with an ignition chamber and a combustion chamber supplied with a stoichiometric mixture, in which a maximum output is made possible independently of the preservation of a good emission control, especially in the lower load ranges.

Still a further object of the present invention resides in an internal combustion engine of the type described above which is simple in construction and operation, requires relatively few parts and can be effectively controlled to achieve the aimed-at purposes.

A further object of the present invention resides in an internal combustion engine operable within the lower load range with exhaust gases low in harmful components while making possible a maximum power output of the engine at upper loads to thereby improve the passing and acceleration characteristics of the vehicle.

These and further objects, features and advantages of the present invention will become more apparent from the following description when taken in connection with the accompanying drawing which shows, for purposes of illustration only, two embodiments in accordance with the present invention, and wherein.

Figure 1:
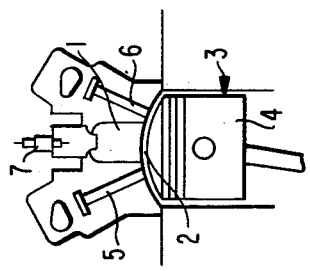
FIG. 1 is a schematic cross-sectional view of the upper part of a cylinder of an internal combustion engine with an ignition chamber.

Referring now to the drawing wherein like reference numerals are used throughout the various views to designate like parts, in the schematic view illustrated in FIG. 1 is illustrated an internal combustion engine with an ignition chamber 1 which terminates in the main combustion space 2 of a cylinder 3, in which a piston 4 is displaceably arranged in the usual manner. An inlet valve 5 and an exhaust valve 6 serve in the embodiment according to FIG. 1 for the control of the gas exchange. A spark plug 7 is coordinated to the ignition chamber 1.

The arrangement of an ignition chamber 1 which in comparison to the volume of the main combustion space is relatively small and preferably amounts to about 5% of the entire combustion space volume, provides with a separate supply thereof with a good and ignitable, preferably approximately stoichiometric mixture, the possibility to supply the main combustion space with a relatively lean, poorly ignitable mixture and to attain nonetheless a good complete combustion of the entire mixture since the ignition energy with such an ignition jet flame is considerably larger than with an ignition by means of a spark plug.

The leaning of the overall mixture which is made possible by the use of an ignition chamber is appropriate with a view toward the reduction of the maximum temperatures and the reduction connected therewith of the NO-emission. The reduction of the maximum temperature, however, also brings about a lowering of the power output, especially as also the combustion is dragged far into the expansion phase by the leaning of the overall mixture and the process efficiency is thereby worsened by an increase of the exhaust gas enthalpy.

Figure 2:
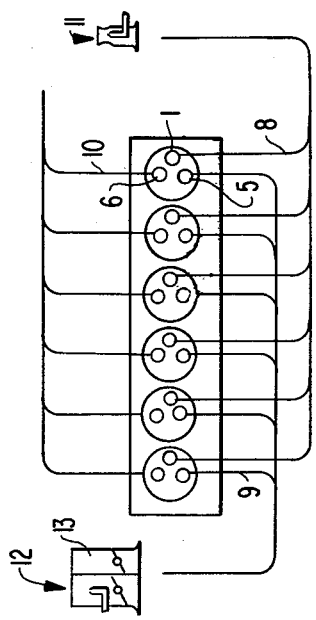
FIG. 2 is a schematic plan view of an internal combustion engine of the present invention according to FIG. 1, whereby the channels coordinated to the inlet and exhaust valves as well as the channels coordinated to the ignition chambers are also schematically indicated.
Figure 3:
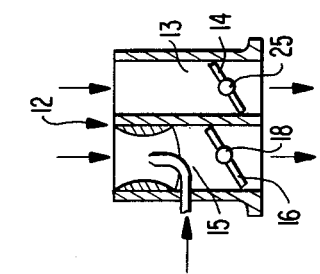
FIG. 3 is a schematic cross-sectional view through a carburetor with an additional air correction in accordance with the present invention which is also indicated schematically in FIG. 2.
Figure 7:
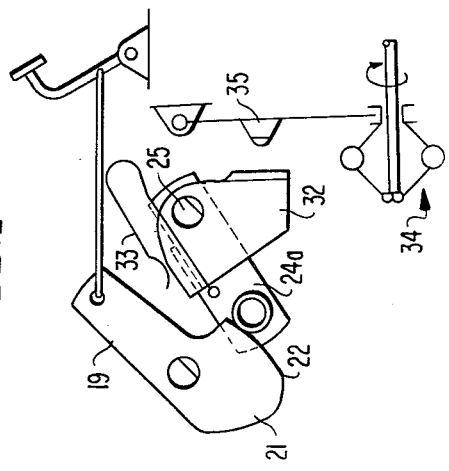
FIG. 7 is a somewhat schematic view, similar to FIG. 4, of a modified embodiment of a pedal control for a carburetor with an air correction according to the present invention whereby the air correction takes place in dependence on the position of the throttle valve and on the rotational speed.

A multi-cylinder internal combustion engine constructed according to FIG. 1 is now illustrated in FIG. 2, and again the inlet and exhaust valves as well as the ignition chamber are indicated again, now, however, in plan view. The same reference numerals are used for these parts as in FIG. 1. Suction lines 8 are thereby connected to the ignition chambers 1 whereas the corresponding inlet channels 9 are controlled by way of the inlet valves 5. The exhaust channels controlled by way of the exhaust valve 6 are designated by reference numeral 10. Suction lines 8, inlet channels 9 and exhaust channels 10 are respectively combined and the suction lines 8 start from a small carburetor 11 which preferably operates without throttling and which serves for the supply of the ignition chambers with a constant, approximately stoichiometric and therewith well-ignitable mixture. The inlet channels 9 start from a carburetor 12 which includes an air by-pass 13 whose free open cross section, as illustrated in particular in FIG. 3, is controllable by way of an air valve 14 operating as throttle valve. In the part 15 of the carburetor serving for the mixture preparation, a throttle valve 16 is provided for the control of the free inflow cross section. The mixture produced in the part 15 which is essentially constant in its quality, i.e., is therefore constant with a view toward its fuel-air ratio, can now be changed in its composition by reason of the provided air by-pass 13, whereby this change is attainable by a corresponding control of the air valve 14 in dependence on the throttle valve 16. Corresponding control installations are illustrated in FIGS. 4 and 7.

Figure 4:
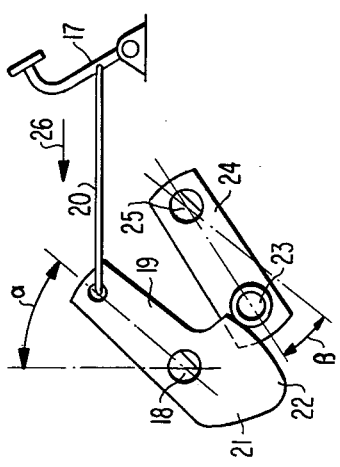
FIG. 4 is a somewhat schematic view of a pedal control for the carburetor with the air correction of the present invention according to FIG. 3.

Referring now to an arrangement according to FIG. 3, an actuation for the throttle valve 16 can be seen in FIG. 4, in which an adjusting lever 19 arranged on the throttle valve shaft 18 is adjustable by means of a pedal 17 by way of a connecting member 20. The adjusting lever 19 non-rotatably arranged on the shaft 18 is constructed cam-like on its side opposite its connection with the connecting member 20 and thus serves as cam 21. The cam surface 22 of the cam 21 cooperates with the abutment 23 of an adjusting lever 24 which is supported on the shaft 25 of the air valve 14 and by way of which the air valve 14 is adjustable. The adjusting angle of the adjusting lever 19 or of the cam 21 constituted thereby and of the adjusting lever 24 are respectively designated in FIG. 5 by $\alpha$ and $\beta$.

The cam surface 22 of the cam 21 is thereby so constructed that when depressing the pedal 17 in the direction of the arrow 26, i.e., during the opening of the throttle valve 16, at first also the air valve 14 is opened and that after reaching the maximum opening position for the air valve 14, the cam surface 22 drops down in such a manner that at the maximum opening position of the throttle valve 16, the air valve 14 is closed. The coordination, in principle, of the adjusting angles $\alpha$ and $\beta$ is illustrated in the diagram according to FIG. 5.

Figure 6:
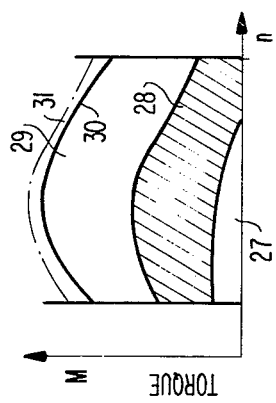
FIG. 6 is a further diagram in which the curves for the torque M are plotted as a function of the rotational speed $n$ whereby these torque curves correspond to ratio lines of the respectively adjusted fuel-air ratio.

The diagram according to FIG. 6 now shows the effect of this measure on the fuel-air ratio, with which the main combustion space is supplied by way of the inlet channels 9.

Figure 5:
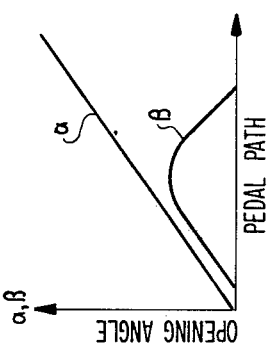
FIG. 5 is a diagram in which the opening angle $\alpha$ of the throttle valve and the opening angle $\beta$ of the air valve of the carburetor with additional air correction are illustrated as a function of the pedal path.

It can be seen at first from FIG. 6 that corresponding to the offset between the beginning of the opening of the throttle valve 16 and the beginning of the opening of the air valve 14, as can be seen from FIG. 5, a range 27 is provided (FIG. 6) in which the mixture, with which the main combustion space is supplied by way of the channels 9, corresponds in its fuel-air ratio to the mixture which is produced in the part 15 of the carburetor 12 serving for the mixture preparation. Essentially a stoichiometric mixture exists therefore within the range 27 by means of which a good transition is attained out of the idling operation. In the range 28 (FIG. 6) disposed thereabove, the driving will take place with a leaneddown mixture since now corresponding to the diagram according to FIG. 5, the air valve 14 is opened together with the throttle valve 16. The coordination of the opening angles is thereby so selected that within the range 28 an approximately constant fuel-air mixture exists, which in relation to its fuel-air ratio lies preferably near the ignitability limit and is correspondingly lean. A very lean combustion results therefrom within the range 28, which has as a consequence a low NO- emission but which leads also to small CO- and HC- emissions by reason of the attained good combustion.

Starting from the upper limit of this lower load range 28, in which one will primarily drive in city- and short-distance-traffic, especially with heavy motors, the mixture supplied by way of the channels 9 is now enriched in relation to its fuel-air ratio, and more particularly in that the air valve 14 is closed during the further opening of the throttle valve 16 opposite to the throttle valve movement. A mixture enrichment results therefrom which at maximum opening position of the throttle valve 16 and with a closed air valve 14 has as a consequence a nearly stoichiometric fuel-air ratio. Corresponding to the diagrams according to FIGS. 5 and 6, there results, starting from the upper limit of the lower load range 28, at first a load range 29 within the limits of which the fuel-air ratio is enriched at first up to the limit value $\lambda = 1$. Above this range 29, which is limited upwardly by the boundary curve 30 which corresponds to a load line at 90 to 95% of load, there results then additionally a narrow range 31 in which, with a closed air valve 14, a mixture with a fuel air ratio of about 0.9 will establish itself.

Whereas in the embodiment according to FIGS. 4 to 6 the exclusively load-dependent control takes place over the entire rotational speed range, a control is illustrated in FIG. 7 which enables additionally a rotational speed control and more particularly in such a manner that in the upper rotational speed range a fuel-air ratio of about 1 is produced over the entire load range whereas in the lower rotational speed range, a control according to the embodiment according to FIGS. 4 to 6 takes place.

Figure 9:
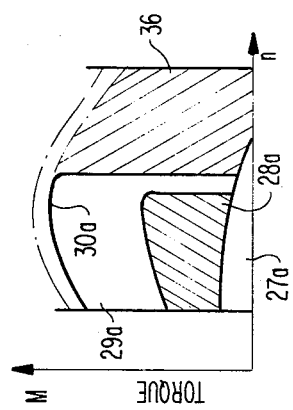
FIG. 9 is a diagram, similar to FIG. 6 for a control according to FIG. 7.
Figure 8:
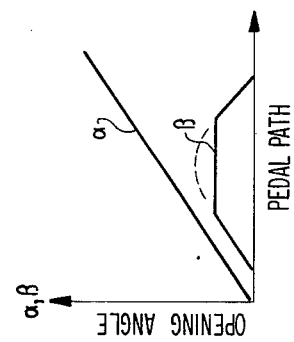
FIG. 8 is a diagram, similar to FIG. 5, for a control according to FIG. 7.

This is achieved according to FIG. 7 in which, as also in FIGS. 8 and 9, analogous reference numerals are used as in FIGS. 4 to 6, in that the adjusting lever 24a is suported on the shaft 25 of the air valve but is not non-rotatably connected therewith so as to enable relative rotation therebetween. The connection in the direction of rotation takes place instead by way of an intermediate lever 32 which is pivotally coupled by way of a spring member 33 with the adjusting lever 24a. The springy connection between the intermediate lever 32 and the adjusting lever 24a is so constructed that a pivoting of the throttle valve 16 in the opening direction does not bring about a forcible pivoting of the air valve 14 when the pivot path of the intermediate lever 32 is limited. Such a limitation can take place in dependence on the rotational speed of the internal combustion engine by way of the centrifugal governor 34 which, in a manner not illustrated in detail, is drivingly connected with the internal combustion engine and which limits the pivot path of the intermediate lever 32 in the opening direction of the air valve 14 by way of an abutment 35.

This has as a consequence that the additional supply of air by way of the air-by-pass 13 is limited to the lower rotational speed range so that exclusively for this range a control of the fuel-air ratio according to the present invention will result, whereby fuel-air ratios according to FIG. 6 will establish themselves within this range. The corresponding ranges are designated by reference numerals 27a, 28a and 29a. The upper boundary curve is designated in FIG. 9 by reference numeral 30a analogous to FIG. 6.

In the range in which according to the diagram according to FIG. 8 the air by-pass 13 is nearly closed by reason of the rotational speed-dependent control and which is designated by reference numeral 36, a nearly stoichiometric fuel-air ratio exists so that in the higher rotational speed ranges no reduction of the output conditioned on a leaning of the mixture has to be accepted.

While I have shown and described two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An internal combustion engine which includes a main combustion space means, ignition chamber means terminating in said main combustion space means, and mixture supply means for supplying a fuel-air mixture to the main combustion space means, characterized in that a further mixture supply means is provided for independently supplying a different fuel-air mixture to the ignition chamber means, and in that the fuel-air ratio of the combustion is controlled by control means in dependence on the load of the engine at least over a portion of the rotational speed range in such a manner that the fuel-air ratio is reduced with an increasing load starting from the upper boundary of a lower load range, in which an approximately constant large fuel-air ratio exists.

2. An internal combustion engine according to claim 1, characterized in that the mixture supply means for the main combustion space means provides an at least approximately homogeneous mixture supply.

3. An internal combustion engine according to claim 1, characterized in that the control means for the fuel-air ratio is provided exclusively for the lower rotational speed range.

4. An internal combustion engine according to claim 3, characterized in that the fuel-air ratio is approximately constant in the upper rotational speed range.

5. An internal combustion engine according to claim 4, characterized in that the fuel-air ratio in the upper rotational speed range is approximately stoichiometric.

6. An internal combustion engine according to claim 2, in which a carburetor means having a throttle valve means is provided for the at least approximately homogeneous supply of the main combustion space means with a mixture, characterized in that an air by-pass means for by-passing said throttle valve means is coordinated to the carburetor means, said by-pass means has a cross section which is variable in dependence on the position of the throttle valve means of the carburetor means.

7. An internal combustion engine according to claim 6, characterized in that the cross section of the air by-pass means is variable by way of an air valve means acting as throttle valve means.

8. An internal combustion engine according to claim 7, characterized in that the air valve means is adjustable together with the throttle valve means of the carburetor means.

9. An internal combustion engine according to claim 8, characterized in that an adjusting cam means is provided for the adjustment of the air valve means, said adjusting cam means being adjustable together with the throttle valve means of the carburetor means.

10. An internal combustion engine according to claim 9, characterized in that the axis of rotation of the throttle valve means of the carburetor means and the axis of the adjusting cam means coincide substantially.

11. An internal combustion engine according to claim 10, characterized in that the air valve means, starting from its closed position, at first opens with an increasing opening of the carburetor throttle valve means, is fully opened approximately at the upper boundary of the lower load range and is then again closed in such a manner that the closing position is attained approximately at full opening of the throttle valve means of the carburetor means.

12. An internal combustion engine according to claim 11, characterized in that the air valve means is controlled by said control means in dependence on the position of the throttle valve means as well as in dependence on the rotational speed in such a manner that the opening angle of the air valve means is limited in the upper direction starting from a predetermined rotational speed value.

13. An internal combustion engine according to claim 11, characterized in that the control means for the fuel-air ratio is provided exclusively for the lower rotational speed range.

14. An internal combustion engine according to claim 13, characterized in that the fuel-air ratio is approximately constant in the upper rotational speed range.

15. An internal combustion engine according to claim 14, characterized in that the fuel-air ratio in the upper rotational speed range is approximately stoichiometric.

16. An internal combustion engine according to claim 15, characterized in that the air valve means is controlled by said control means in dependence on the position of the throttle valve means as well as in dependence on the rotational speed in such a manner that the opening angle of the air valve means is limited in the upper direction starting from a predetermined rotational speed value.

17. An internal combustion engine according to claim 1, in which a carburetor means having a throttle valve means is provided for the supply of the main combustion space means with a mixture, characterized in that an air by-pass means for by-passing said throttle valve means is coordinated to the carburetor means, said by-pass means has a cross section which is variable in dependence on the position of the throttle valve means of the carburetor means.

18. An internal combustion engine according to claim 17, characterized in that the cross section of the air by-pass means is variable by way of an air-valve means acting as throttle valve means.

19. An internal combustion engine according to claim 18, characterized in that an adjusting cam means is provided for the adjustment of the air valve means, said adjusting cam means being adjustable together with the throttle valve means of the carburetor means.

20. An internal combustion engine according to claim 19, characterized in that the axis of rotation of the throttle valve means of the carburetor means and the axis of the adjusting cam means coincide substantially.

21. An internal combustion engine according to claim 18, characterized in that the air valve means, starting from its closed position, at first opens with an increasing opening of the carburetor throttle valve means, is fully opened approximately at the upper boundary of the lower load range and is then again closed in such a manner that its closing position is attained approximately at full opening of the throttle valve means of the carburetor means.

22. An internal combustion engine according to claim 18, characterized in that the air valve means is controlled by said control means in dependence on the position of the throttle valve means as well as in dependence on the rotational speed in such a manner that the opening angle of the air valve means is limited in the upper direction starting from a predetermined rotational speed value.

23. An internal combustion engine according to claim 21, characterized in that the mixture supply means for the main combustion space means provides an homogeneous mixture supply.

24. An internal combustion engine comprising an ignition chamber means terminating in a main combustion space means, means for supplying a fuel-air mixture to said main combustion space means, means for supplying a fuel-air mixture to said ignition chamber means independently of said fuel-air mixture supplying means of said main combustion space means, and control means for controlling the fuel-air ratio of said main combustion space means to supply said main combustion space means with an approximately stoichiometric air-fuel mixture during an idling and lower partial load range, a reduced approximately constant fuel-air mixture lying approximately near an ignitable limit during a load range between the lower partial load range and an upper partial load range, and continuously increasing the fuel proportion in the fuel-air mixture during the upper partial load range until an approximately stoichiometric mixture is obtained in a full load range.

25. An internal combustion engine according to claim 24, wherein said means for supplying a fuel-air mixture to said ignition chamber means supplies an approximately stoichiometric mixture during the entire load range of the internal combustion engine.

26. An internal combustion engine according to claim 25, wherein said fuel-air mixture supplying means of said main combustion space means includes a carburetor having a throttle valve means for controlling a free inflow cross-section thereof, and wherein said control means includes an air by-pass means arranged at said carburetor for by-passing said throttle valve means, an air valve means arranged in said air by-pass means, and means for operatively connecting said throttle valve means to said air valve means such that said air valve means is displaced in dependence upon a positioning of said throttle valve means.

27. An internal combustion engine according to claim 26, wherein said means for operatively connecting said throttle valve means to said air valve means includes a first adjusting lever arranged on a throttle valve shaft of said throttle valve means, a second adjusting lever arranged on a shaft of said air valve means and operatively connected with said first adjusting lever, and means for connecting said first adjusting lever with a load control means of the internal combustion engine.

28. An internal combustion engine according to claim 27, wherein said first adjusting lever includes a cam surface cooperable with said second adjusting lever.

29. An internal combustion engine according to claim 28, wherein said second adjusting lever includes an abutment surface means engageable with said cam surface.

30. An internal combustion engine according to claim 28, wherein said cam surface includes a first surface portion configured such that during an opening of the throttle valve means, said air valve means is continuously opened and a second surface portion at which the throttle valve means is at a maximum opening position with the air valve means being closed.

* * * * *